US008566291B2

(12) United States Patent
Auvenshine et al.

(10) Patent No.: US 8,566,291 B2
(45) Date of Patent: Oct. 22, 2013

(54) METHODS AND PHYSICAL COMPUTER STORAGE MEDIA FOR TRANSFERRING DE-DUPLICATED DATA ORGANIZED IN VIRTUAL VOLUMES TO A TARGET SET OF PHYSICAL MEDIA FOR FORMING A BITMAP AND CREATING A VOLUME MAP

(75) Inventors: John J. Auvenshine, Tucson, AZ (US);
Erik Bartholomy, Superior, CO (US);
Andrew G. Hourselt, Tucson, AZ (US);
John T. Olson, Tucson, AZ (US);
Harley D. Puckett, III, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/534,115

(22) Filed: Jun. 27, 2012

(65) Prior Publication Data
US 2013/0054912 A1 Feb. 28, 2013

Related U.S. Application Data

(63) Continuation of application No. 13/221,038, filed on Aug. 30, 2011.

(51) Int. Cl.
*G06F 17/30* (2006.01)
*G06F 12/00* (2006.01)

(52) U.S. Cl.
USPC ........... 707/692; 707/655; 707/644; 707/662; 707/828; 711/161; 711/162; 711/165; 711/170; 711/6; 711/203

(58) Field of Classification Search
USPC ................ 707/692, 655, 644, 664, 662, 828; 711/161, 162, 165, 170, 6, 203
See application file for complete search history.

(56) References Cited

U.S. PATENT DOCUMENTS

| 6,513,051 B1 | 1/2003 | Bolosky et al. |
| 7,584,338 B1 | 9/2009 | Bricker et al. |
| 7,904,747 B2 * | 3/2011 | Zohar et al. .................. 714/6.12 |
| 7,904,749 B2 * | 3/2011 | Kawaguchi .................... 714/6.1 |

(Continued)

FOREIGN PATENT DOCUMENTS

| IN | 200801960 | 2/2010 |
| JP | 2009129441 | 6/2009 |

OTHER PUBLICATIONS

Dirk Meister et al., "Multi-Level Comparison of Data Deduplication in a Backup Scenario", 2009, 12 pages.

*Primary Examiner* — Hong Kim
(74) *Attorney, Agent, or Firm* — Griffiths & Seaton PLLC

(57) ABSTRACT

A method include forming an initial bitmap from the de-duplicated data on virtual volumes, sorting discrete blocks according to frequency of occurrence to form a revised bitmap to first include a plurality of most common discrete blocks, creating a physical volume map from the revised bitmap, reviewing, from the physical volume map, an initial virtual volume of the virtual volumes contained on a corresponding original physical volume, to determine whether moving the initial virtual volume to a different physical volume reduces the total number of data blocks in the physical volume map, deleting the initial virtual volume from its corresponding original physical volume and adding the initial virtual volume to the different original physical volume to create a revised physical volume map including revised physical volumes, and writing the revised physical volumes to the target set of physical media using the revised physical volume map.

11 Claims, 4 Drawing Sheets

(56) References Cited

U.S. PATENT DOCUMENTS

| | | | |
|---|---|---|---|
| 8,190,850 B1 * | 5/2012 | Davenport et al. | 711/202 |
| 2008/0244172 A1 | 10/2008 | Kano | |
| 2009/0327625 A1 | 12/2009 | Jaquette et al. | |
| 2010/0036887 A1 | 2/2010 | Anglin et al. | |
| 2010/0094817 A1 * | 4/2010 | Ben-Shaul et al. | 707/697 |
| 2010/0281081 A1 | 11/2010 | Stager et al. | |
| 2010/0281228 A1 | 11/2010 | Wade et al. | |
| 2011/0016095 A1 | 1/2011 | Anglin et al. | |
| 2011/0055498 A1 * | 3/2011 | Kano | 711/156 |
| 2011/0191305 A1 * | 8/2011 | Nakamura et al. | 707/692 |
| 2011/0225214 A1 * | 9/2011 | Guo | 707/813 |
| 2012/0330907 A1 * | 12/2012 | Nakamura et al. | 707/692 |
| 2013/0054919 A1 * | 2/2013 | Auvenshine et al. | 711/165 |
| 2013/0060739 A1 * | 3/2013 | Kalach et al. | 707/692 |

* cited by examiner

METHODS AND PHYSICAL COMPUTER STORAGE MEDIA FOR TRANSFERRING DE-DUPLICATED DATA ORGANIZED IN VIRTUAL VOLUMES TO A TARGET SET OF PHYSICAL MEDIA FOR FORMING A BITMAP AND CREATING A VOLUME MAP

CROSS-REFERENCE TO RELATED APPLICATIONS

This application is a Continuation of U.S. patent application Ser. No. 13/221,038, filed on Aug. 30, 2011.

BACKGROUND OF THE INVENTION

1. Field of the Invention

The present invention relates in general to de-duplicated data and methods of transferring de-duplicated data that is organized in virtual volumes to a target set of physical media.

2. Description of the Related Art

Data deduplication is a data storage method for eliminating or reducing redundant data. In particular, data deduplication allows one unique instance of the data to be retained on storage media rather than multiple instances of the same data by replacing the multiple instances of the same data with a pointer to a single instance. In this regard, data stored into a deduplication system is analyzed and broken into "blocks." Duplicate blocks are identified, each unique block is given a digital signature to show that the two blocks with the same signature are the same data, and the duplicate blocks are eliminated. Normally, as the deduplication system breaks apart data comprising larger objects into the individual blocks, the system tracks the individual blocks so that the corresponding larger object can be retrieved when desired. For example, an index or database is provided to track the blocks.

The deduplication system may be embodied in a storage management system that spans multiple storage volumes and storage pools. For example, data may be sent by storage management clients or data protection agents to the storage management server for storage. In this regard, a storage management system typically stores copies of objects on separate media, so that a data set that is too large to fit on a single volume can be stored. Alternatively, data can be moved from one storage location to another, either within the same storage pool or between storage pools or between different media, such as between a disk and tape, which store different amounts of data.

SUMMARY OF THE INVENTION

Many virtual volumes are stored in a large, homogeneous storage pool. Typically, the storage is disk-based, and the virtual volumes are not individually de-depulicated but rather are de-depulicated as part of entry to the storage pool. When there is a need to write these virtual volumes out to physical media, difficulty may arise where each item of physical media is a small fraction of the size of the original storage pool. Thus, it is desirable to have a method and system for transferring de-duplicated data that is organized in virtual volumes into a target set of physical media.

In an improved method, steps include forming an initial bitmap from the de-duplicated data on virtual volumes, the de-duplicated data on virtual volumes comprising a total number of discrete blocks, sorting the discrete blocks according to frequency of occurrence to form a revised bitmap to first include a plurality of most common discrete blocks, creating a physical volume map from the revised bitmap, the physical volume map associating each discrete block of the de-duplicated data blocks on a virtual volume with an original physical volume and including a total set of original virtual volumes and total number of data blocks, reviewing, from the physical volume map, an initial virtual volume of the virtual volumes contained on a corresponding original physical volume, to determine whether moving the initial virtual volume from its corresponding original physical volume to a different physical volume in the total set of original physical volumes reduces the total number of data blocks in the physical volume map without exceeding a total number of allowed blocks on the different physical volume, deleting the initial virtual volume from its corresponding original physical volume and adding the initial virtual volume to the different original physical volume to create a revised physical volume map including revised physical volumes, and writing the revised physical volumes to the target set of physical media using the revised physical volume map.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide an improved method for transferring de-duplicated data that is organized in virtual volumes to a target set of physical media. The method includes forming an initial bitmap from the de-duplicated data on virtual volumes, the de-duplicated data on virtual volumes comprising a total number of discrete blocks, sorting the discrete blocks according to frequency of occurrence to form a revised bitmap to first include a plurality of most common discrete blocks, creating a physical volume map from the revised bitmap, the physical volume map associating each discrete block of the de-duplicated data blocks on a virtual volume with an original physical volume and including a total set of original virtual volumes and total number of data blocks, reviewing, from the physical volume map, an initial virtual volume of the virtual volumes contained on a corresponding original physical volume, to determine whether moving the initial virtual volume from its corresponding original physical volume to a different physical volume in the total set of original physical volumes reduces the total number of data blocks in the physical volume map without exceeding a total number of allowed blocks on the different physical volume, deleting the initial virtual volume from its corresponding original physical volume and adding the initial virtual volume to the different original physical volume to create a revised physical volume map including revised physical volumes, and writing the revised physical volumes to the target set of physical media using the revised physical volume map.

Figure 1:
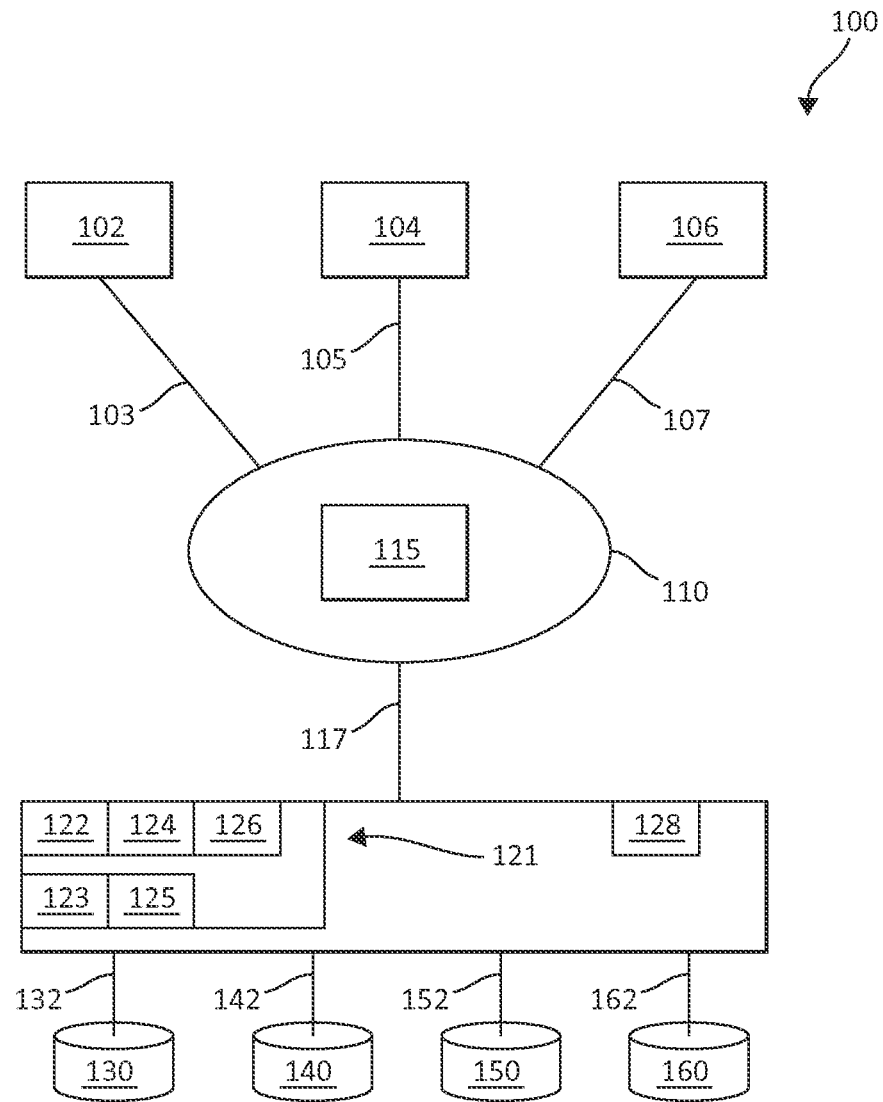
FIG. 1 is a block diagram of a data storage system, according to an embodiment.

FIG. 1 is a block diagram of a data storage system, according to an embodiment. Data processing system 100 comprises storage controller 120 and data storage media 130, 140, 150, and 160. In the illustrated embodiment of FIG. 1, storage controller 120 communicates with data storage media 130, 140, 150, and 160, via I/O protocols 132, 142, 152, and 162, respectively. I/O protocols 132, 142, 152, and 162, may comprise any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

As used herein, the term "data storage media" is defined as an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In other embodiments, the information storage medium comprises an optical information storage medium, such as and without limitation a CD, DVD (Digital Versatile Disk), HD-DVD (High Definition DVD), BD (Blue-Ray Disk) and the like. In still other embodiments, the information storage medium comprises an electronic information storage medium, such as and without limitation a PROM, EPROM, EEPROM, Flash PROM, compactflash, smartmedia, and the like. In still yet other embodiments, the information storage medium comprises a holographic information storage medium.

Storage controller 120 communicates with host computers 102, 104, and 106. Generally, hosts computers 102, 104, and 106, each comprises a computing system, such as a mainframe, personal computer, workstation, and combinations thereof, including an operating system such as Windows®, AIX®, Unix®, Z/OS®, LINUX®, etc. (Windows® is a registered trademark of Microsoft Corporation; AIX® is a registered trademark and Z/OS® is a trademark of IBM Corporation; UNIX® is a registered trademark in the United States and other countries licensed exclusively through The Open Group; and LINUX® is a registered trademark of Linus Torvald). One or more of host computers 102, 104, and/or 106, further includes a storage management program. In accordance with an embodiment, the storage management program may include a functionality of storage management type programs known in the art that manage the transfer of data to and from a data storage and retrieval system, such as for example and without limitation the IBM DFSMS implemented in the IBM Z/OS® operating system.

Storage controller 120 comprises processor 128 and computer readable medium 121, microcode 122 written to computer readable medium 121, instructions 124 written to computer readable medium 121, a first stage hash algorithm 123 written to computer readable medium 121, and a second stage hash algorithm 125 written to computer readable medium 121. Processor 128 utilizes microcode 122 to operate storage controller 120. In the illustrated embodiment of FIG. 1, storage controller 120 further comprises deduplication queue 126. Processor 128 performs certain operations related to data received from one or more host computers, such as for example and without limitation data deduplication.

In an embodiment, host computers 102, 104, and 106, are connected to fabric 110 utilizing I/O protocols 103, 105, and 107, respectively. I/O protocols 103, 105, and 107, may be any type of I/O protocol; for example, TCP/IP, NFS, CIFS, FTP, HTTP protocols, a Fibre Channel ("FC") loop or Fibre Channel over Ethernet, a direct attachment to fabric 110 or one or more signal lines used by host computers 102, 104, and 106, to transfer information to and from fabric 110.

In certain embodiments, fabric 110 includes, for example, one or more FC switches 115. Those one or more switches 115 comprise one or more conventional router switches, in an embodiment. In the illustrated embodiment of FIG. 1, one or more switches 115 interconnect host computers 102, 104, and 106, to storage controller 120 via I/O protocol 117. I/O protocol 117 may comprise any type of I/O interface, for example, a Fibre Channel, Infiniband, Gigabit Ethernet, Ethernet, Fibre Channel over Ethernet, TCP/IP, iSCSI, SCSI I/O interface or one or more signal lines used by FC switch 115 to transfer information to and from storage controller 120, and subsequently data storage media 130, 140, 150, and 160. In other embodiments, one or more host computers, such as for example and without limitation host computers 102, 104, and 106, communicate directly with storage controller 120 using I/O protocols 103, 105, and 107, respectively.

Figure 2A:
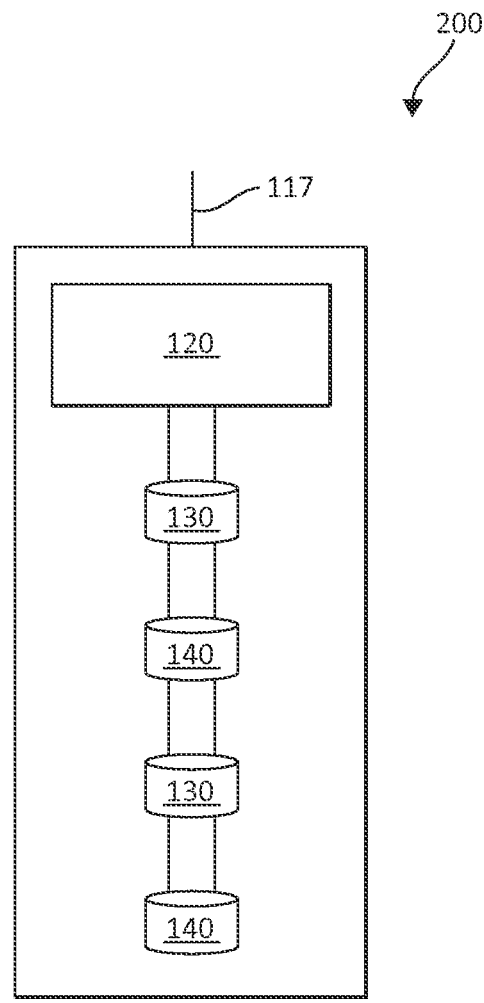
FIG. 2A is a schematic of storage controller communicating with data storage media, according to an embodiment

FIG. 2A is a schematic of storage controller 120 communicating with data storage media 130, 140, 150, and 160, according to an embodiment. In an embodiment, communication occurs using a fibre channel arbitrated ("FC-AL") loop of switches, wherein controller 120 and media 130, 140, 150, and 160, are disposed in information storage and retrieval system 200. As those skilled in the art will appreciate, information storage and retrieval system 200 further comprises additional elements, such as and without limitation one or more host adapters, one or more device adapters, a data cache, non-volatile storage, and the like. The illustrated embodiment of FIG. 2A should not be construed to limit the invention to use of fibre channel networks or devices. In other embodiments, other network topologies and devices are utilized, including without limitation SAS devices and/or SATA devices.

Figure 2B:
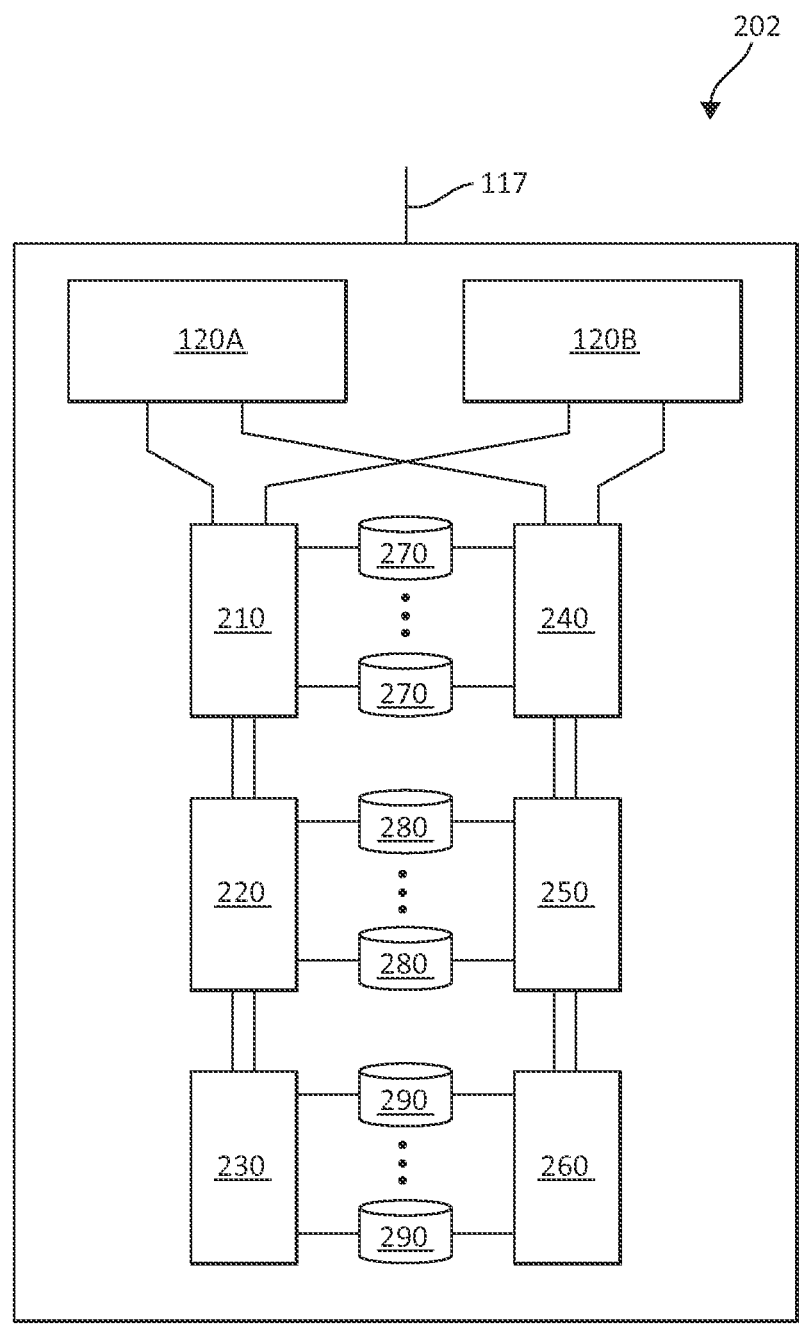
FIG. 2B is a schematic of an information storage and retrieval system, according to an embodiment.

FIG. 2B is a schematic of an information storage and retrieval system 202, according to an embodiment. The system 202 comprises dual FC-AL loops of switches wherein storage controller 120A and storage controller 120B are interconnected with both FC-AL loops. Each FC-AL loop contains one or more local controllers, such as local controllers 210, 220, 230, 240, 250, and 260. As those skilled in the art will appreciate, information storage and retrieval system 200 further comprises additional elements, such as and without limitation one or more host adapters, one or more device adapters, a data cache, non-volatile storage, and the like. Each storage controller is in communication with a first plurality of data storage media 270, a second plurality of data storage media 280, and a third plurality of data storage media 290. The illustrated embodiment of FIG. 2B should not be construed to limit the invention to use of fibre channel networks or devices. In the illustrated embodiment of FIG. 2B, the recitation of two FC-AL loops comprises one embodiment of Applicants' apparatus. In other embodiments, other network topologies and devices are utilized, including without limitation SAS devices and/or SATA devices.

Each plurality of data storage media 270, 280, 290 represents a physical volume ($P_n$) on which data is stored. The data on the physical volumes (PO are treated as blocks. Many times, although the data blocks are located on particular physical volumes, the blocks are grouped together logically into virtual volumes ($V_n$) and thus, can span over multiple disks. However on tapes that are physical volumes, it is desirable for virtual volumes not to span tapes because retrieving one virtual volume could require multiple tape mounts.

Because some of the blocks may be redundant, the data may be de-depulicated to eliminate the redundant data, leaving only one copy of the data to be stored. Thus, to optimize storage, all discrete blocks ($B_n$) are ideally stored on as few physical volumes ($P_n$) as possible. Accordingly, an absolute ideal number of physical volumes is equal to the number of discrete blocks $B_n$ divided by the number of blocks that can be stored on each $P_n$ so that each physical volume (e.g., data storage media 270, 280, 290) is completely full of discrete blocks.

Figure 3:
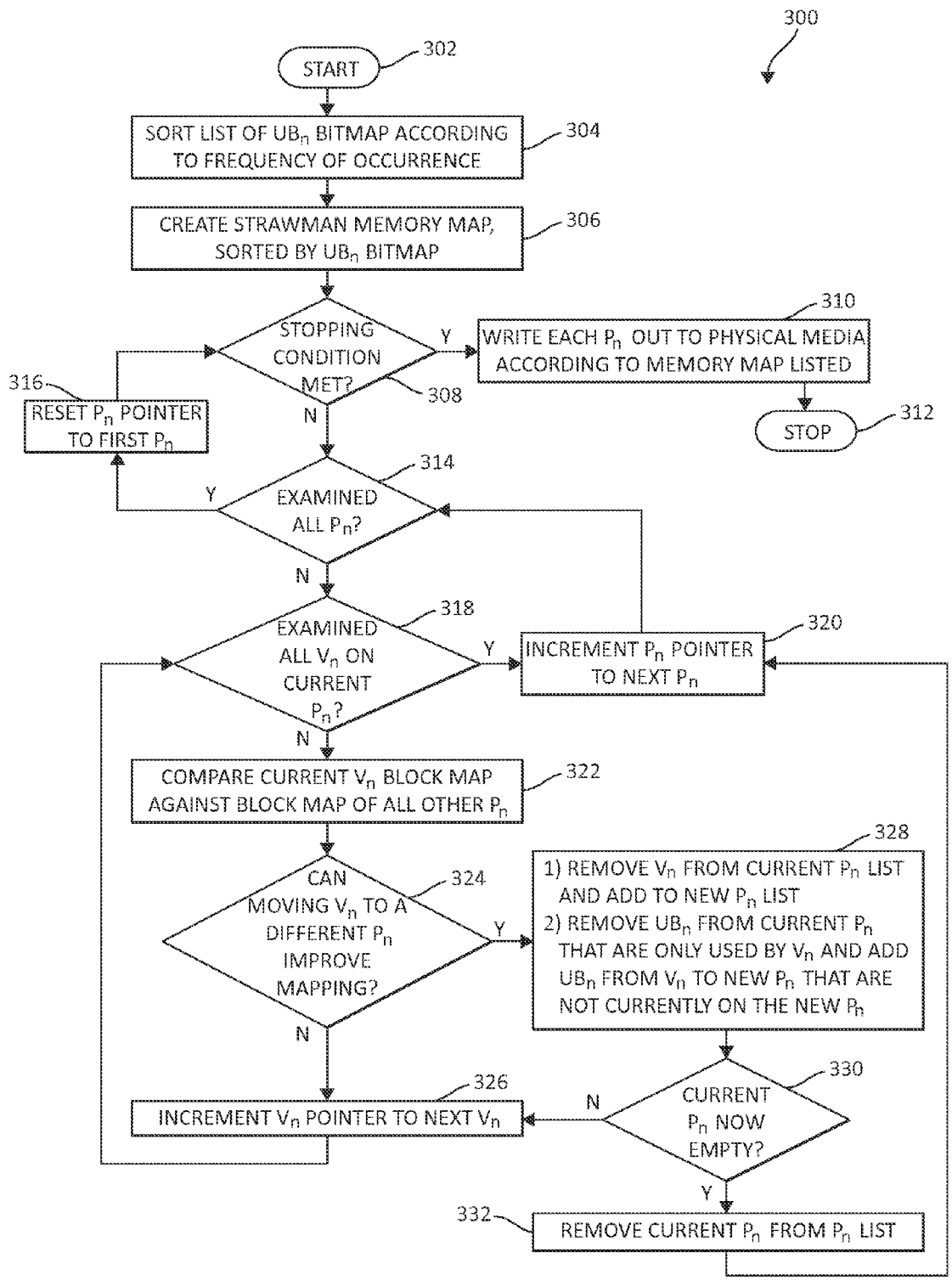
FIG. 3 is a flow diagram of a method of transferring de-duplicated data that is organized in virtual volumes to a target set of physical media, according to an embodiment.

FIG. 3 is a flow diagram of a method 300 of transferring de-duplicated data that is organized in virtual volumes to a target set of physical media, according to an embodiment. Method 300 can be employed to achieve the above-described ideal storage. In an embodiment, after the start 302, a list of discrete blocks ($UB_n$) is sorted into a bitmap according to frequency of occurrence, block 304. In an embodiment, the initial bitmap is formed from the de-duplicated data that has been organized into virtual volumes, where the de-duplicated data organized into the virtual volumes comprise a total number of discrete blocks. According to an embodiment, a set of virtual volumes can have a total N number of discrete blocks, ($B_{n1}$ ... $B_{nN}$). A first virtual volume may have some of the discrete blocks and may contain $B_{n1}, B_{n2}, B_{n3}, B_{n7}$, and $B_{n8}$. A resulting bitmap for the first virtual volume may be 11100011. A second virtual volume may have some of the discrete blocks and may contain $B_{n1}, B_{n2}, B_{n3}, B_{n5}, B_{n6}, B_{n7}$, and $B_{n8}$. In such case, the resulting bitmap for the second virtual volume may be 11101111. After bitmaps are created for all of the virtual volumes of the set of virtual volumes, the bitmaps are compared to determine a frequency of the discrete blocks as they appear in each virtual volume. For instance, the first and second virtual volumes may be compared:

11100011 (first virtual volume)
11101111 (second virtual volume)

The discrete blocks of the bitmaps are sorted according to frequency of occurrence to form a revised bitmap to first include a plurality of most common discrete blocks, in an embodiment. As shown above, $B_{n1}, B_{n2}, B_{n3}$ are the most common discrete blocks in the first and second virtual volumes, and thus could be eliminated from consideration to improve speed of the process and/or to form the revised bitmap. In another embodiment, the initial bitmap can be created by any one of numerous processes.

Next, a strawman memory map is created and sorted according to the bitmap, block 306. For example, the strawman memory map (also referred to herein as "a physical volume map") is created from the revised bitmap. The physical volume map associates each discrete block of the de-duplicated data on a virtual volume with an original physical volume and including a total set of original virtual volumes and a total number of data blocks. In an embodiment, the physical volume map is an in memory map. In other embodiments, the physical volume map is stored or referenced from another area where mapping can be stored. To improve processing at block 306, each original physical volume associated with the physical volume map is sorted by corresponding block bitmaps into descending order, where a plurality of most common data blocks appears to form the physical volume map. As a result, physical volumes in the map with the most common blocks group together at the top of the list and are more likely to be considered, and thus eliminated, first. In an embodiment, a subset of data blocks in the plurality of data blocks may be identified, where the subset of data blocks has a common bit pattern so that portions of each data block in the subset not including the common bit pattern can be compared in subsequent steps.

In any case, after the strawman memory map is created, a determination is made as to whether a stopping condition has been met, block 308. In an embodiment, the stopping condition is met after a number of iterations (e.g., a maximum number of allowed loops) has been performed. In another embodiment, the stopping condition is met after a predetermined number of iterations is performed without an occurrence of a deletion of a reviewed physical volume. In another embodiment, the stopping condition is met when an ideal total number of physical volumes or a predetermined percentage of a total number of original physical volumes has been achieved. In yet another embodiment, the stopping condition is met after a predetermined duration of time. If the stopping condition has been met, then each physical volume is written out to physical media (e.g., data storage media 270, 280, 290) according to the memory map listed, block 310. Specifically, revised physical volumes are written to the target set of physical media using a revised physical volume map, which will be described in more detail below. The method 300 then stops at block 312.

If a determination has been made that the stopping condition has not been met, then another determination is made as to whether all physical volumes have been examined, block 314. If so, a physical volume pointer is set to a first physical volume, block 316, and the method 300 iterates from block 308.

If all physical volumes have not been examined, then a determination is made as to whether all of the virtual volumes on a current physical volume have been examined, block 318. If so, a physical volume pointer is set to a next physical volume, block 320, and the method 300 iterates at block 314.

If not, a comparison is made between a block bitmap of the virtual volumes against a block bitmap of all of the physical volumes other than that of the current physical volume, block 322. For example, a bitmap of an initial virtual volume (e.g., a bitmap of a virtual volume that has not been examined) is compared with each bitmap of each original physical volume in the total set of original physical volumes.

Next, a determination is made as to whether moving a virtual volume to a different physical volume can improve mapping, block 324. In particular, the determination is based on whether moving the initial virtual volume from an original physical volume with which it is associated to a new physical volume will improve mapping. Improving mapping can be achieved by reducing a number of physical volumes or reducing the total number of blocks required to be store on the original physical volumes plus the total number of blocks required to be stored on the different physical volume and after the move, neither the original physical volume nor the different physical volume contain more blocks than the maximum number of blocks which can be stored on the physical volume. In an embodiment, a review is made of the initial virtual volume of the virtual volumes contained on a corresponding original physical volume from the physical volume map, to determine whether moving the initial virtual volume from its corresponding original physical volume to a different physical volume in the total set of original physical volumes reduces the total number of data blocks in the physical volume map without exceeding a total number of allowed blocks on the different physical volume. After the initial virtual volume is examined, a subsequent virtual volume of the virtual volumes contained on a corresponding original physical volume then is reviewed from the revised physical volume map, to determine whether moving the subsequent virtual volume from its corresponding original physical volume to a different original physical volume or revised physical volume reduces the total number of data blocks in the revised physical volume map without exceeding a total number of allowed blocks on the different original physical volume or revised physical volume, and so on. In still another embodiment, reviewing comprises identifying consolidation targets in the virtual volumes, wherein the consolidation targets comprise common data blocks, and determining whether moving the common data blocks from corresponding original physical volumes to different physical volumes in the total set of original physical volumes reduces the total number of data blocks in the physical volume map without exceeding a total number of allowed blocks on the different physical volume.

If mapping is not improved at block 324, then the system increments a virtual volume pointer to a next virtual volume, block 326, and the method 300 iterates at block 318.

If mapping is improved, then the virtual volume is removed from a current physical volume list and added to a new physical volume list, and the discrete block from the current physical volume that is used only by the virtual volume is removed and added to the new physical volume, if the discrete block is not already on the new physical volume, block 328. In an embodiment, the initial virtual volume is deleted from its corresponding original physical volume and added to the different original physical volume to create a revised physical volume map including revised physical volumes. In subsequent iterations after the initial virtual volume is examined (e.g., after a subsequent virtual volume is examined), the subsequent virtual volume is deleted from its corresponding original physical volume and added to the different original physical volume or revised physical volume to create a subsequent revised physical volume map including subsequent revised physical volumes.

In any case, a determination is made as to whether the current physical volume is empty, block 330. If not, the system increments the virtual volume pointer to a next virtual volume, block 326, and the method 300 iterates at block 318. If the current physical volume is empty, then the current physical volume is removed from the current physical volume list, block 332, and the method 300 iterates to block 320.

An improved method has now been provided that can be used as an open standard for writing de-depulicated virtual volumes to a physical volume. The method efficiently transfers de-duplicated data that is organized in virtual volumes to a target set of physical media so that the physical media includes only discrete blocks of data for all of the virtual volumes. Moreover, some embodiments of the method retain hash index values to reconstitute complete virtual volumes when read from a single volume of the physical media.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A method of transferring de-duplicated data that is organized in virtual volumes to a target set of physical media comprising:
    forming an initial bitmap from the de-duplicated data on virtual volumes, the de-duplicated data on virtual volumes comprising a total number of discrete blocks;
    sorting the discrete blocks according to frequency of occurrence to form a revised bitmap to first include a plurality of most common discrete blocks;
    creating a physical volume map from the revised bitmap, the physical volume map associating each discrete block of the de-duplicated data on a virtual volume with an original physical volume and including a total set of original virtual volumes and a total number of data blocks;
    reviewing, from the physical volume map, an initial virtual volume of the virtual volumes contained on a corresponding original physical volume, to determine whether moving the initial virtual volume from its corresponding original physical volume to a different physical volume in the total set of original physical volumes reduces the total number of data blocks in the physical volume map without exceeding a total number of allowed blocks on the different physical volume;
    deleting the initial virtual volume from its corresponding original physical volume and adding the initial virtual volume to a different original physical volume to create a revised physical volume map including revised physical volumes; and
    writing the revised physical volumes to the target set of physical media using the revised physical volume map.

2. The method of claim 1, wherein:
the method further comprises the step of sorting each original physical volume associated with the physical volume map by corresponding block bitmaps into descending order first including a plurality of most common data blocks to a least common data block to form the physical volume map.

3. The method of claim 2, wherein:
the step of reviewing further comprises identifying a subset of data blocks in the plurality of data blocks, the subset of data blocks having a common bit pattern and comparing portions of each data block in the subset not including the common bit pattern.

4. The method of claim 1, wherein:
the step of reviewing further comprises comparing a bitmap of the initial virtual volume with each bitmap of each original physical volume in the total set of original physical volumes.

5. The method of claim 1, wherein:
the step of reviewing further comprises reviewing, from the revised physical volume map, a subsequent virtual volume of the virtual volumes contained on a corresponding original physical volume, to determine whether moving the subsequent virtual volume from its corresponding original physical volume to a different original physical volume or revised physical volume reduces the total number of data blocks in the revised physical volume map without exceeding a total number of allowed blocks on the different original physical volume or revised physical volume; and
deleting the subsequent virtual volume from its corresponding original physical volume and adding the subsequent virtual volume to the different original physical volume or revised physical volume to create a subsequent revised physical volume map including subsequent revised physical volumes.

6. The method of claim 1, further comprising:
the step of reviewing further comprises identifying consolidation targets in the virtual volumes, wherein the consolidation targets comprise common data blocks, and determining whether moving the common data blocks from corresponding original physical volumes to different physical volumes in the total set of original physical volumes reduces the total number of data blocks in the physical volume map without exceeding a total number of allowed blocks on the different physical volume.

7. The method of claim 1, further comprising:
repeating the steps of reviewing and deleting until a predetermined number of iterations are performed without an occurrence of a deletion of a reviewed physical volume.

8. The method of claim 7, further comprising:
deleting an empty physical volume, after the step of repeating.

9. The method of claim 1, further comprising:
repeating the steps of reviewing and deleting for a predetermined duration of time.

10. The method of claim 1, further comprising:
repeating the steps of forming an initial bitmap, sorting the discrete blocks, creating a physical volume map from the revised bitmap, reviewing, and deleting until a predetermined percentage of a total number of original physical volumes is achieved.

11. The method of claim 1, further comprising:
repeating the steps of forming an initial bitmap, sorting the discrete blocks, creating a physical volume map from the revised bitmap, reviewing, and deleting until a predetermined percentage above an ideal number of physical volumes is achieved, wherein the ideal number is defined as each discrete block being written out to only one completely full physical volume.

* * * * *